Jan. 13, 1970    J. S. BASS    3,489,225
LAWN MOWER MOUNTED TRIMMING ATTACHMENT
Filed April 21, 1967
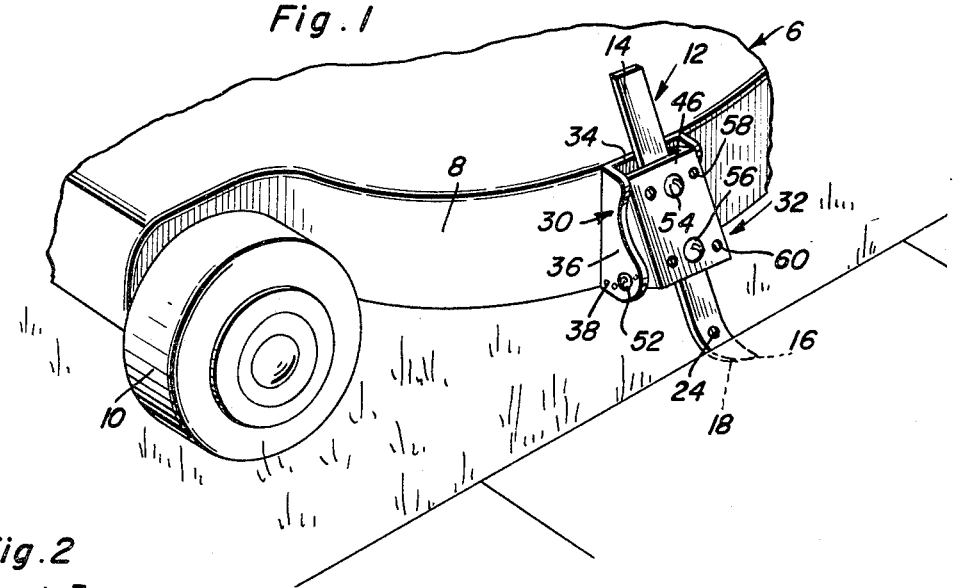
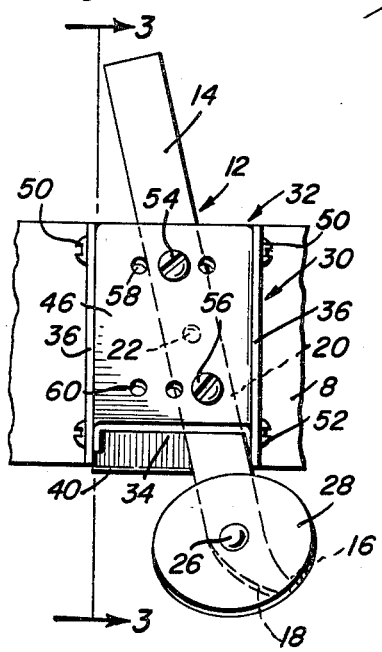
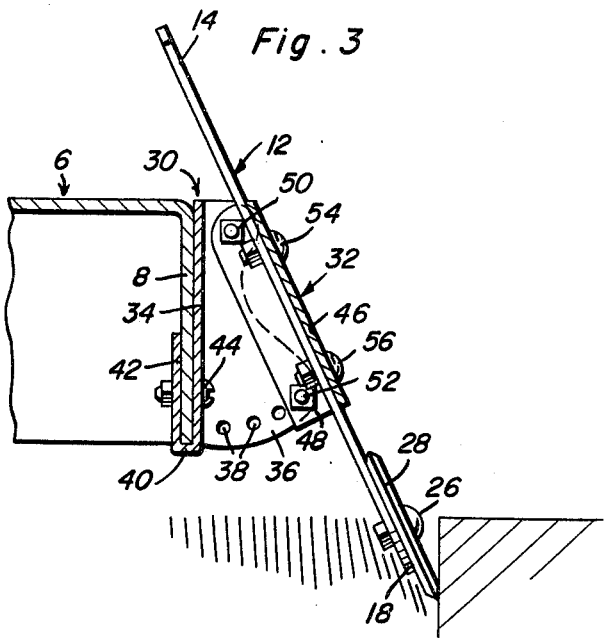
James S. Bass
INVENTOR.

United States Patent Office 3,489,225
Patented Jan. 13, 1970

3,489,225
LAWN MOWER MOUNTED TRIMMING
ATTACHMENT
James S. Bass, 300 W. 9th St.,
Winfield, Kans. 67156
Filed Apr. 21, 1967, Ser. No. 632,720
Int. Cl. A01b *45/00;* A01d *35/26*
U.S. Cl. 172—15                                 7 Claims

ABSTRACT OF THE DISCLOSURE

A self-contained edging and trimming attachment for a power lawn mower characterized by two-part bracket means, namely, a first U-shaped adapter bracket which is adapted to be bolted on the rim wall and which tiltably supports a second U-bracket on which a bar-type blade is operatively mounted.

BACKGROUND OF THE INVENTION

This invention relates to a self-contained attachment for use on the exterior peripheral surface of the rim wall of the usual housing of a power driven lawn mower, said attachment being unique in that it is equipped with novel edging and trimming means, more particularly, an adjustable bar member which provides an edging blade and whose lower working end is provided with an optionally usable cutting and trimming disk.

SUMMARY

Briefly, the invention comprises an elongated rigid relatively narrow flat-faced bar member whose lower working end is provided with an arcuately curved leading edge and a bolt hole for an optional cutter disk which can be bolted in place when needed. The median apertured portion of this blade is detachably bolted on the plate or bight portion of a U-shaped blade mounting and anchoring bracket and can be raised and lowered and angularly inclined either forwardly or rearwardly to assume an advantageous position. This blade and anchoring bracket, conjointly construed, is hingedly and adjustably mounted on a complemental U-shaped bracket herein designated as an adapter and which is mounted by a single bolt on the rim or wall of the mower. The U-shaped or channel-like form of the brackets permits the respective flanges to be telescopingly interrelated and hingedly and adjustably bolted together, whereby to achieve the end result desired.

The general objective is to structurally, functionally and in other ways to improve upon edgers and trimmers which fall in that classification designated as ready-to-install attachments. To the ends desired the two-part bracket means is novel, that is each bracket is unique in and of itself and the brackets conjointly provide a highly satisfactory mount for a simple elongated bar whose lower end is expressly designed to provide the edging and trimming features desired.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a view in perspective showing a fragmentary portion of a power-type lawn mower and showing, what is more important, the edging and trimming attachment constructed in accordance with the invention with the cutting disk omitted.

FIG. 2 is a view in side elevation on a larger scale and which shows not only the disk in its attached position but also shows the bar member or blade slanted or inclined rearwardly that is in a direction from front to rear.

And FIG. 3 is a section taken approximately on the plane of the vertical section line 3—3 of FIG. 2.

DESCRIPTION OF THE PREFERRED EMBODIMENT

The concept is to be constructed wherein the blade and mounting means is combined, as an attachment or otherwise with the skirt or rim wall of the lawn mower. However, it will be understood that novelty is also predicated on the invention in the sense that it is a self-contained attachment which can be sold as such and then applied to lawn mowers which are already in use.

In FIG. 1 the lawn mower housing is denoted generally by the numeral 6 and is shown with a depending skirt or rim wall 8 and roller or wheel means 10. The attachment is preferably applied to the side of the rim opposite the side (not shown) which, in practice, has a discharge opening for the cuttings.

The blade means is denoted by the numeral 12 and comprises a simple elongated flat-faced rigid metal or equivalent bar member which has an upper end portion 14 and a lower end portion 16 whose forward or advancing lengthwise edge is arcuately curved as at 18 to satisfactorily perform in the manner shown in FIG. 1 and assuming that the lawn mower is being rolled along in a direction from right to left. The median body portion of the bar member denoted at 20 is provided with one or more bolt holes 22 as shown in phantom lines in FIG. 2. The lower end portion is also provided with a bolt hole 24 to accommodate a bolt and nut assembly 26 which serves to apply and clampingly retain the optionally usable cutting disk 28. It will be evident therefore that the blade 12 can be used without the disk as shown in FIG. 1 for cleavage and edging purposes. Also, and when preferred the cutting disk for excavating and trimming purposes can be applied in the manner illustrated in FIGS. 2 and 3.

The bracketing and mounting means for the blade means 12 is preferably constructed of two component parts; namely, an adapter or first bracket 30 and a complemental second blade mounting and anchoring bracket 32. The bracket 30 is referred to as channel-shaped in cross-section or simply as U-shaped and in either instance it embodies a bight or plate portion 34 of the approximate length shown and a pair of wing-like flanges 36. These flanges may be contoured as shown in FIG. 1 in particular and they are in spaced parallel relationship and the lower curvate end portions are provided with selectively usable bolt holes 38 for a purpose later to be described. The lower end portion of the plate 34 is provided with a laterally bent portion 40 terminating in an upwardly bent attaching flange 42 thus providing a saddle or seat for the lower edge portion of the wall 8. Ordinarily a single bolt or an equivalent fastener 44 is passed through the component parts 34, 8 and 42 thus securing the bracket 30 in place. The bracket 32 is also U-shaped or substantially channel-like in cross-section and it too has a bight or plate portion 46 having spaced parallel side flanges 48 which are telescopingly received between the flanges 36. Bolts 50 serve to hingedly join the upper ends of the flanges 48 to the flanges 36 thus providing the tiltable mount for the bracket 32. The flanges 48 are provided at lower end portions with additional bolts 52 which are arranged in a manner that the paired flanges 36 and 48 are adjustably joined in the manner shown in FIG. 3.

The plate or bight portion 46 of bracket 32 serves to permit the median apertured or body portion of the blade to be bolted in place by upper and lower bolts 54 and 56 as shown to advantage in FIG. 2. The upper bolt 54 is connectible with one a row of bolt holes 58 and the bolt 56 at the bottom is connectible with a selected one of similar bolt holes also in row alignment as at 60.

It will be clear from the views of the drawing that the first or primary bracket, also called an adapter 30, is bolted in place on the wall 8 to assume the relatively fixed position shown in FIG. 3. The blade means 12 is then bolted on the web or bight portion 46 of the blade anchoring bracket 32. This blade can be adjusted vertically to raise and lower the lower end cutting and trimming means. In addition, it can be adjusted to assume the central aproximately right angular position shown in FIG. 1 by properly bolting it in place. Also it can be tilted or swung forwardly or rearwardly to an inclined or angular position as shown in FIG. 2. The additional fact that the bracket 32 is adjustable relative to the fixed bracket 30 provides for additional positioning of the edging and cutting means. It follows that the attachment as herein shown and described well serves the purposes for which it is intended.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. For use on a wheel-supported power driven lawn mower characterized by a cutter blade housing with a depending rim wall, an edging and trimming attachment for a predetermined peripheral surface of said wall comprising: readily applicable, removable and accessible bracketing and mounting means embodying an adapter bracket which is U-shaped in cross-section and embodies a plate-like bight portion with an integral hook at a lower end having means whereby it can be bolted and fastened to a coacting lower edge portion of said wall and being provided with a pair of spaced parallel outstanding vertical flanges, a companion blade supporting and anchoring bracket complemental to said adapter bracket and which is likewise U-shaped and also embodies a plate-like bight portion which is opposed to said first-named bight portion and has a pair of spaced parallel vertical flanges projecting toward said adapter bracket and fitting telescopingly between said first-named flanges and having upper ends hingedly bolted and thus pivotally hung between corresponding upper ends of said first-named flanges, and also having lower end portions which are not only swingable toward and from said first-named bight portion but have adjusting and retaining bolts which are selectively and retentively connectible with arcuate rows of bolt holes which are provided therefor in said adapter flanges, said second-named bight portion having a plurality of selectively usable bolt holes arranged in upper and lower spaced parallel substantially horizontal rows, an elongated blade-type bar member of a width appreciably narrower than the predetermined width of said second-named bight portion and having upper and lower ends projecting to positions above and below corresponding portions of said second-named bight portion, and a median portion provided with bolts which are detachably and adjustably mounted by way of said upper and lower rows of bolt holes.

2. The combination defined in and according to claim 1 and wherein said bar member is vertically independently adjustable and raisable and lowerable in a direction wherein the lower end portion can be positioned and operatively held for use depending on the horizontality and level of the lawn surface, and wherein the lower end portion has a longitudinally arcuate leading edge.

3. The combination defined in and according to claim 1 and wherein said bar member is vertically independently adjustable and raisable and lowerable in a direction wherein the lower end portion can be positioned and operatively held for use depending on the horizontality and level of the lawn surface, and wherein the lower end portion has a longitudinally arcuate leading edge, and an optionally usable cutter disk detachably mounted for operation atop an exterior surface of said lower end.

4. In combination, a mobile power driven lawn mower embodying a housing having a depending skirt-like rim, an edging blade having a body portion and upper and lower end portions, readily accessible bracketing and mounting means for said blade comprising a rigid adapter bracket U-shaped in cross-section and including a plate-like bight portion marginally provided with spaced parallel outstanding flanges, said bight portion being superimposed upon and removably bolted and anchored in an operative position on a peripheral surface of said rim, and a complemental blade anchoring bracket similarly U-shaped in cross-section and embodying a plate-like bight portion having marginal spaced parallel flanges fitting telescopingly between the flanges on said adapter bracket and hingedly and adjustably cradled between said adapter flanges, said blade comprising a relatively narrow essentially straight flat-faced elongated bar member, the body portion of said blade being superimposed upon and adjustably mounted on an underneath side of the plate-like bight portion of said blade anchoring bracket and having a lower end depending below a corresponding lower end of said anchoring bracket and an upper end projecting above the upper portion of said anchoring bracket.

5. The combination defined in and according to claim 4 and wherein the blade comprises a rigid bar member which is narrow compared to the width of the plate-like bight portion of said anchoring bracket, said body portion being flat-faced and mounted on the median part of the plate-like bight portion.

6. The combination defined in and according to claim 5 and wherein the lower end of said bar member has a longitudinally arcuately curved leading edge capable of use for edging and trimming purposes.

7. The combination defined in and according to claim 6 and, in combination, a flat-faced disk having a marginal cutting edge, a median hub portion of the body of said disk being superimposed upon and movably bolted atop an exterior flat-face of the lower end of said bar member, said disk being of a diameter appreciably greater than the cross-sectional dimension of the bar member and constituting optional edging and trimming means whereby to permit the user to utilize the aforementioned curved leading edge by itself or if desired the disk in lieu of said arcuately curved leading edge.

References Cited

UNITED STATES PATENTS 2,691,823 10/1954 Dombrowski.
3,003,301 10/1961 Koon _____ 56—25.4
3,231,024 1/1966 Lazich _____ 172—14

ROBERT E. PULFREY, Primary Examiner

J. W. PETERSON, Assistant Examiner

U.S. Cl. X.R.

56—25.4